United States Patent
Choi

(10) Patent No.: US 11,200,904 B2
(45) Date of Patent: Dec. 14, 2021

(54) ELECTRONIC APPARATUS, CONTROLLING METHOD AND COMPUTER READABLE MEDIUM

(71) Applicant: SAMSUNG ELECTRONICS CO., LTD., Suwon-si (KR)

(72) Inventor: Chanhee Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 102 days.

(21) Appl. No.: 16/409,008

(22) Filed: May 10, 2019

(65) Prior Publication Data
US 2019/0362726 A1 Nov. 28, 2019

(30) Foreign Application Priority Data
May 25, 2018 (KR) .................. 10-2018-0059901

(51) Int. Cl.
*G10L 17/22* (2013.01)
*G10L 17/04* (2013.01)

(52) U.S. Cl.
CPC .............. *G10L 17/22* (2013.01); *G10L 17/04* (2013.01)

(58) Field of Classification Search
CPC ......... G06F 3/167; G10L 15/22; G10L 15/06; G10L 17/24; G10L 17/22
See application file for complete search history.

(56) References Cited

U.S. PATENT DOCUMENTS 6,356,868 B1 * 3/2002 Yuschik ............... G10L 17/14
704/246
6,751,590 B1 * 6/2004 Chaudhari .............. G10L 17/02
704/246
6,766,295 B1 * 7/2004 Murveit ................. G10L 15/30
379/88.01
(Continued)

FOREIGN PATENT DOCUMENTS

JP   2008-058452   3/2008
JP   4440502      3/2010
(Continued)

OTHER PUBLICATIONS

International Search Report and Written Opinion dated Aug. 23, 2019 in counterpart International Application No. PCT/KR2019/005661.
(Continued)

*Primary Examiner* — Anne L Thomas-Homescu
(74) *Attorney, Agent, or Firm* — Nixon & Vanderhye P.C.

(57) ABSTRACT

An electronic apparatus is provided. The electronic apparatus includes an inputter comprising input circuitry, a voice receiver comprising voice receiving circuitry, a storage, and a processor configured to: provide a guide prompting a user utterance based on user authentication being performed according to user information input through the inputter, generate a speaker recognition model corresponding to the user information based on a voice corresponding to the guide being received through the voice receiver, store the speaker recognition model in the storage, and identify a user corresponding to a voice received through the voice receiver based on the speaker recognition model updated by comparing a voice received through the voice receiver with the speaker recognition model.

17 Claims, 11 Drawing Sheets

(56) References Cited

U.S. PATENT DOCUMENTS

| | | | |
|---|---|---|---|
| 8,812,320 B1* | 8/2014 | Roblek | G10L 15/02 |
| | | | 704/246 |
| 9,343,068 B2 | 5/2016 | Yun et al. | |
| 9,484,029 B2 | 11/2016 | Jung et al. | |
| 9,786,271 B1* | 10/2017 | Combs | G10L 15/005 |
| 2003/0036903 A1* | 2/2003 | Konopka | G10L 15/065 |
| | | | 704/249 |
| 2007/0219928 A1* | 9/2007 | Madhogarhia | G06Q 20/401 |
| | | | 705/75 |
| 2008/0195389 A1* | 8/2008 | Zhang | G10L 17/24 |
| | | | 704/246 |
| 2010/0063817 A1* | 3/2010 | Toyama | G10L 17/04 |
| | | | 704/243 |
| 2010/0106502 A1* | 4/2010 | Farrell | G10L 17/00 |
| | | | 704/246 |
| 2010/0106503 A1* | 4/2010 | Farrell | G10L 17/24 |
| | | | 704/246 |
| 2010/0268537 A1* | 10/2010 | Al-Telmissani | G10L 17/04 |
| | | | 704/246 |
| 2013/0238334 A1* | 9/2013 | Ma | G10L 17/04 |
| | | | 704/244 |
| 2015/0301796 A1* | 10/2015 | Visser | G10L 15/22 |
| | | | 715/728 |
| 2016/0232893 A1 | 8/2016 | Subhojit | |
| 2017/0017782 A1* | 1/2017 | Roos | G06F 21/31 |
| 2017/0053645 A1* | 2/2017 | Pierfelice | G10L 15/07 |
| 2019/0295554 A1* | 9/2019 | Lesso | G06F 16/683 |
| 2019/0311722 A1* | 10/2019 | Caldwell | G10L 17/02 |
| 2019/0325880 A1* | 10/2019 | Khitrov | G10L 17/24 |

FOREIGN PATENT DOCUMENTS

| | | |
|---|---|---|
| JP | 4440502 B2 * | 3/2010 |
| JP | 2011-064913 | 3/2011 |
| KR | 10-0641013 | 10/2006 |
| KR | 10-2014-0086853 | 7/2014 |
| KR | 10-2016-0014465 | 2/2016 |
| KR | 10-2016-0047834 | 5/2016 |
| KR | 10-2016-0098771 | 8/2016 |

OTHER PUBLICATIONS

Extended Search Report dated Oct. 11, 2019 in counterpart European Patent Application No. 19174786.4.

Sanchez Avila, Carmen et al., "State of the art of mobile biometrics, liveness and non-coercion detection," Mar. 4, 2014, pp. 1-135, XP055478777, url:https://www.pcas-project.eu/images/Deliverables/PCAS-D3.1.pdf, retrieved May 28, 2018.

European Examination Report dated Apr. 13, 2021 for EP Application No. 19174786.4.

* cited by examiner

FIG. 1
(RELATED ART)
PLEASE READ SENTENCE ON SCREEN FOR REGISTRATION (1/30)
"HELLO, I AM VERY PLEASED TO MEET YOU"
SKIP
PLEASE READ SENTENCE ON SCREEN FOR REGISTRATION (2/30)
"DO YOU LISTEN TO SAD MUSIC OFTEN?"
SKIP
PLEASE READ SENTENCE ON SCREEN FOR REGISTRATION (30/30)
"YOU HAVE GOT FANTASTIC VOICE"
SKIP

FIG. 2A
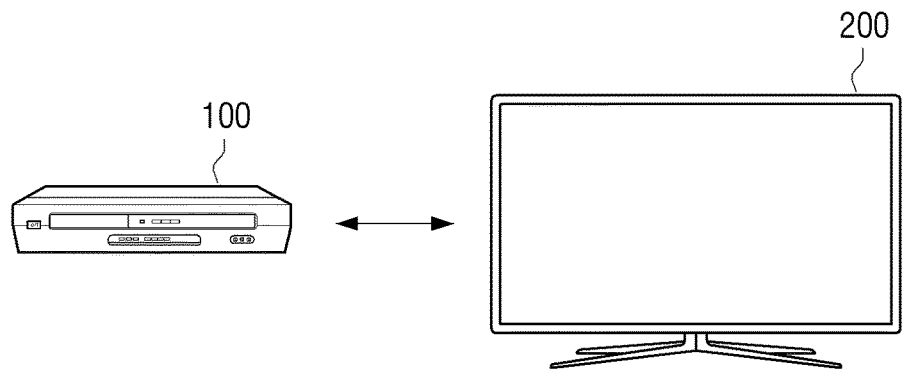
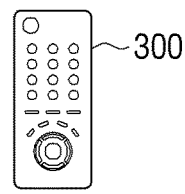
FIG. 2B
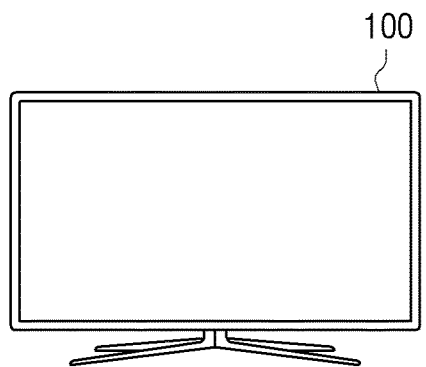
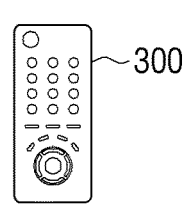

```
PLEASE READ SENTENCE ON SCREEN FOR REGISTRATION

"THIS IS SENTENCE FOR SPEAKER RECOGNITION"
```

```
                                                    SKIP
```

ELECTRONIC APPARATUS, CONTROLLING METHOD AND COMPUTER READABLE MEDIUM

CROSS-REFERENCE TO RELATED APPLICATION

This application is based on and claims priority under 35 U.S.C. § 119 to Korean Patent Application No. 10-2018-0059901, filed on May 25, 2018, in the Korean Intellectual Property Office, the disclosure of which is incorporated by reference herein in its entirety.

BACKGROUND

1. Field

The present disclosure relates to an electronic apparatus, a controlling method thereof and a computer readable medium, and, for example, to a technique for building a system for recognizing a speaker in a sentence-independent manner.

2. Description of Related Art

Speaker recognition refers to a technique of comparing input voice data with pre-stored data and identifying a speaker.

A process of registering a speaker recognition model for a user is necessary for speaker recognition. In other words, the process includes notifying the system of the speaker who uttered the currently input voice and registers the speaker recognition model for the user who uttered the input voice based on the feature extracted from the input voice.

The process of registering a speaker recognition model may be categorized by two types according to the speaker recognition method. The two types includes a sentence-dependent method in which only the designated sentence or word is uttered, and the speaker recognition model is registered by extracting the voice characteristic of the user based on the utterance, and a sentence-independent model in which a sufficient number of sentences and words are made to be uttered in order to allow the speaker to recognize the free speech of the user, and then a speaker recognition model is registered by extracting the voice characteristic of a user based on the utterance.

The sentence-independent method is advantageous in that it can recognize the speaker of a voice regardless of the voice of the user based on a large amount of data than the sentence-dependent method.

However, the conventional sentence-independent method has caused the inconvenience for a user because the amount of words and sentences to be uttered by the in registering the speaker recognition model is too large.

Particularly, in the conventional sentence-independent method, as the time for recording the user's utterance is increased, the parameters based on the user's fatigue, the accuracy of the utterance recognition, the ambient noise, etc. increase and the quality of the registered speaker recognition model deteriorates.

FIG. 1 is a diagram illustrating part of a conventional technique in registering a speaker recognition model for speaker recognition in a sentence-independent manner. FIG. 1 sequentially shows images displayed in the process of registering a speaker recognition model, and each image requests a user to utter a specific sentence.

Referring to FIG. 1, in the conventional speaker recognition model registration, a user may be requested to utter a large number of sentences sequentially. For example, as shown in FIG. 1, if a user utters a voice according to a sequential utterance request for 30 types of texts, and receives the uttered voice, a user may feel inconvenience in a continuous job.

In addition, the accuracy of the speaker recognition model that is finally registered due to the inaccuracy of the voice uttered by the weary user may be deteriorated.

SUMMARY

An example aspect of the example embodiments relates to providing an electronic apparatus, a controlling method of an electronic apparatus, and a computer-readable medium for reducing fatigue of a user in a sentence-independent manner speaker recognition model and improving quality by continuously updating a speaker recognition model through user voice while a user is provided with a general voice recognition service as well as requesting a divided content to be uttered by a user based on user authentication.

According to an example embodiment, there is provided an electronic apparatus including an inputter comprising input circuitry, a voice receiver comprising voice receiving circuitry, a storage, and a processor configured to provide a guide for prompting a user utterance based on user authentication being performed based on user information input through the inputter, to generate a speaker recognition model corresponding to the user information based on a voice corresponding to the guide received through the voice receiver, to store the speaker recognition model in the storage, and to identify a user corresponding to a voice received through the voice receiver based on a speaker recognition model updated by comparing a voice received through the voice receiver with the speaker recognition model.

The processor may provide the guide including a part of a plurality of texts stored in the storage, and based on a text corresponding to the voice received through the voice receiver matching a text included in the guide, generate the speaker recognition model based on a feature value of the received voice.

The processor may identify, based on a voice being received through the voice receiver while a voice recognition service is provided, whether the speaker recognition model stored in the storage and a feature value of the received voice have a similarity equal to or greater than a predetermined threshold value, and based on the similarity being equal to greater than the predetermined threshold value, update the speaker recognition model stored in the storage based on the feature value of the received voice.

The processor, based on a text corresponding to the voice received through the voice receiver being included in a plurality of texts stored in the storage while the voice recognition service is provided, may update the speaker recognition model stored in the storage based on the feature value of the received voice.

The processor, based on user authentication being performed again based on the user information, may identify completion of updating of the speaker recognition model corresponding to the user information, and based on the updating of the speaker recognition model not being completed, may provide a guide for prompting an utterance of a text that is not uttered by a user from among a plurality of texts stored in the storage.

The processor, based on a voice based on the guide being received through the voice receiver, may update the speaker recognition model based on a feature value of the received voice and generate a final speaker recognition model corresponding to the user information.

The processor, based on user authentication being performed based on the user information, may provide a user interface indicating an updating progress of the speaker recognition model.

The processor, based on user authentication being performed based on the user information input through the inputter, may identify (determine) whether the speaker recognition model corresponding to the user information is stored in the storage, and wherein the guide, based on the speaker recognition model corresponding to the user information not being stored in the storage, includes a user interface for selecting whether the speaker recognition model corresponding to the user information is generated.

The processor, based on a specific user being initially logged in based on the user information input through the inputter, may provide a guide for prompting an utterance of the specific user, based on a voice based on the guide being received through the voice receiver, may generate a speaker recognition model corresponding to the specific user based on the received user information and stores the speaker recognition model in the storage, and may update the speaker recognition model by comparing the voice received through the voice receiver while a voice recognition service is provided when the specific user is logged in with the speaker recognition model stored in the storage.

According to an example embodiment, there is provided a controlling method for an electronic apparatus, the method including providing a guide for prompting a user utterance based on user authentication being performed based on user information input through an inputter, generating and storing a speaker recognition model corresponding to the user information based on a voice corresponding to the guide which is received through a voice receiver, and identifying a user corresponding to a voice received through the voice receiver based on a speaker recognition model updated by comparing a voice received through the voice receiver with the speaker recognition model.

The providing of the guide may include providing the guide including a part of a plurality of pre-stored texts, and wherein the generating and storing of the speaker recognition model comprises, based on a text corresponding to the voice received through the voice receiver matching a text included in the guide, generating the speaker recognition model based on a feature value of the received voice.

The updating of the speaker recognition model may include, based on a voice being received through the voice receiver while a voice recognition service is provided, identifying (determining) whether the stored speaker recognition model and a feature value of the received voice have a similarity equal to or greater than a predetermined threshold value, and based on the similarity being equal to or greater than the predetermined threshold value, updating the stored speaker recognition model based on the feature value of the received voice.

The updating of the speaker recognition model may include, based on a text corresponding to the voice received through the voice receiver being included in a plurality of pre-stored texts while the voice recognition service is provided, updating the stored speaker recognition model based on the feature value of the received voice.

The method may further include based on user authentication being performed again based on the user information, identifying completion of updating of the speaker recognition model corresponding to the user information, and based on the updating of the speaker recognition model not being completed, providing a guide for prompting an utterance of a text that is not uttered by a user from among a plurality of pre-stored texts.

The method may further include, based on a voice according to the guide being received from the voice receiver, generating a final speaker recognition model corresponding to the user information by updating the speaker recognition model based on a feature value of the received voice.

The method may further include, based on user authentication being performed again based on the user information, providing a user interface indicating an update progress of the speaker recognition model.

The method may further include identifying (determining) whether a speaker recognition model corresponding to the user information is stored based on user authentication being performed according to the user information input through the inputter, wherein the guide, based on the speaker recognition model corresponding to the user information not being stored, includes a user interface that allows a user to select whether the speaker recognition model corresponding to the user information is generated.

The providing of the guide may include, based on a specific user being initially logged in based on the user information input through the inputter, providing a guide for prompting an utterance of the specific user, wherein the generating and storing of the speaker recognition model includes, based on a voice based on the guide being received through the voice receiver, generating and storing a speaker recognition model corresponding to the specific user based on the received voice, and wherein the updating of the speaker recognition model includes comparing the voice received through the voice receiver while a voice recognition service is provided when the specific user is logged in with the stored speaker recognition model, and updating the speaker recognition model.

According to an example embodiment, there is provided a non-transitory computer readable medium having stored thereon at least one computer command which, when executed by a processor of an electronic apparatus, causes the electronic apparatus to perform operations, wherein the operations include providing a guide for prompting a user utterance based on user authentication being performed based on user information input through an inputter, generating and storing a speaker recognition model corresponding to the user information based on a voice corresponding to the guide which is received through a voice receiver, and identifying a user corresponding to a voice received through the voice receiver based on a speaker recognition model updated by comparing a voice received through the voice receiver with the speaker recognition model.

An electronic apparatus, a controlling method thereof, and a computer-readable medium according to the disclosure is advantageous in alleviating user's inconvenience that a user has to speak a large amount of utterances for registering a speaker recognition model for speaker recognition in a sentence-independent manner, and providing a more accurate speaker recognition model.

For example, unlike a case where a user enters voice recognition for free utterance while being authenticated by uttering a specific word or sentence, when voice recognition for free utterance starts without further process or only with processing a button, since a large amount of voices needs to be uttered and trained for each user in order to identify a user and recognize a voice corresponding to the identified user when it has not been yet recognized who is the subject of freely utterance, the effect of providing a speaker recognition model according to the disclosure may become significant.

BRIEF DESCRIPTION OF THE DRAWINGS

The above and/or other aspects, features and attendant advantages of various example embodiments of the present disclosure will become more apparent and readily appreciated from the following detailed description, taken in conjunction with the accompanying drawings, in which like reference numerals refer to like elements, and wherein:

FIG. 1 is a diagram illustrating a problem of a conventional speaker recognition model registration process;

FIG. 2A is a diagram illustrating an example configuration of an electronic apparatus according to an embodiment of the disclosure;

FIG. 2B is a diagram illustrating an example configuration of an electronic apparatus according to an embodiment of the disclosure;

DETAILED DESCRIPTION

Figure 3:
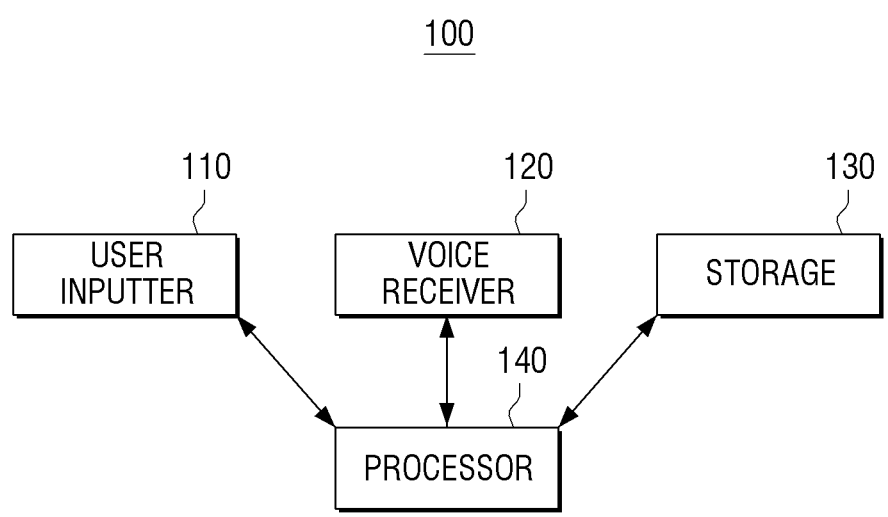
FIG. 3 is a block diagram illustrating an example configuration of an electronic apparatus according to an embodiment of the disclosure.

The terms used in this disclosure will be briefly described, and the disclosure will be described in greater detail.

All the terms used in this disclosure including technical and scientific terms have the same meanings as would be generally understood by those skilled in the related art. However, these terms may vary depending on the intentions of the person skilled in the art, legal or technical interpretation, and the emergence of new technologies. In addition, some terms may be arbitrarily selected. These terms may be understood to have the meaning defined herein and, unless otherwise specified, may be understood based on the entire contents of this disclosure and common technical knowledge in the art.

The disclosure is not limited to an example embodiment disclosed below and may be implemented in various forms and the scope of the disclosure is not limited to the following example embodiments. In addition, all changes or modifications derived from the meaning and scope of the claims and their equivalents should be understood as being included within the scope of the disclosure. In the following description, the configuration which is publicly known but may not be relevant to the gist of the disclosure may be omitted.

The terms such as "first," "second," and so on may be used to describe a variety of elements, but the elements should not be limited by these terms. The terms are used simply to distinguish one element from other elements. The use of such ordinal numbers should not be understood as limiting the meaning of the term. For example, the components associated with such an ordinal number should not be limited in the order of use, placement order, or the like. If necessary, each ordinal number may be used interchangeably.

The singular expression also includes the plural meaning as long as it does not conflict with the context. In this disclosure, terms such as 'include' and 'have/has' should be understood as designating that there are such features, numbers, operations, elements, components or a combination thereof in the disclosure, not to exclude the existence or possibility of adding one or more of other features, numbers, operations, elements, components or a combination thereof.

In an example embodiment, 'a module', 'a unit', or 'a part' perform at least one function or operation, and may be realized as hardware, such as, for example, and without limitation, a processor, integrated circuit, or the like, software that is executed by a processor, or any combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

In the disclosure, 'at least one of a, b or c' means 'only a, only b, only c, both a and b, both a and c, both b and c, all of a, b, and c, or variations thereof.

FIGS. 2A and 2B are diagrams illustrating an example electronic apparatus 100, an external device 200 including a display, and a remote control device 300. The electronic apparatus 100 may be embodied, for example, and without limitation, as TVs, smart TVs, set-top boxes, PCs, servers, terminal devices, mobile phones, table PCs, or the like.

The external device 200 may be embodied, for example, and without limitation, as TVs, smart TVs, PCs, or the like, including a display, and the remote control device 300 may be embodied, for example, and without limitation, as a TV remote controller, a terminal device storing an application for controlling a TV, or the like.

FIG. 2A is a diagram illustrating a non-limiting example in which the electronic apparatus 100 is embodied as a set-top box without a display.

In this example, the electronic apparatus 100 and the external device 200 may exchange signals each other. For example, the electronic apparatus 100 may transmit image signals to the external device 200 to display images. The electronic apparatus 100 may transmit signals regarding voices to the external device 200 to output voices.

The remote control device 300 may output a signal for controlling at least one of the electronic apparatus 100 and/or the external device 200 based, for example, on a user command. The remote control device 300 may transmit a signal including user information to at least one of the electronic apparatus 100 and/or the external device 200.

FIG. 2B is a diagram illustrating a non-limiting example in which the electronic apparatus 100 is embodied as a TV or a smart TV with a display.

The electronic apparatus 100 may display images and/or output voices based on the control signals received, for example, from the remote control device 300. The electronic apparatus 100 may receive signals including, for example, user information from the remote control device 300.

FIG. 3 is a block diagram illustrating an example configuration of an electronic apparatus and an external device. Referring to FIG. 3, an electronic apparatus 100 may include a user inputter (e.g., including input circuitry) 110, a voice receiver (e.g., including voice receiving circuitry) 120, a storage 130 and a processor (e.g., including processing circuitry) 140.

The user inputter 110 may include various input circuitry and may be a configuration that enables the electronic apparatus 100 to receive commands or information from a user.

The user inputter 110 may include various input circuitry, such as, for example, and without limitation, a microphone (not shown), or the like, and receive a user voice uttered by a user using the microphone. The user inputter 110 may include circuitry to convert a user voice in an analog form into a digital form, and transmit the user voice in the digital form to at least one of the voice receiver 120 and/or the processor 140.

The user inputter 110 may include, for example, and without limitation, a touch panel (not shown) with a display (not shown) or an additional touch pad (not shown) to receive user commands or information by touch.

The user inputter 110 may receive information on the texts input by a user. The user inputter 110 may include, for example, and without limitation, a keyboard or a mouse (not shown) and receive specific texts from the user using the keyboard and/or the mouse.

The user inputter 110 may receive user's biometric information in addition to user voices. The user inputter 110 may include, for example, and without limitation, a sensor for recognizing fingerprints of a user, a camera for recognizing a user face, a sensor for recognizing user's iris, or the like.

When a signal including a user command or information is transmitted from the remote control device 300 to a communicator (not shown) of the electronic apparatus 100, the user inputter 110 may receive the signal including the user command and the information from the communicator (not shown).

The remote control device 300 may receive a command for text input from a user and transmit the received signal to the communicator (not shown) of the electronic apparatus 100. The user inputter 110 may receive a user command for text input in the form of receiving a signal including a user command from the communicator (not shown).

The remote control device 300 may receive fingerprint information from a user using a sensor for fingerprint recognition (not shown), and transmit a signal including the input fingerprint information to the user inputter 110 through the communicator (not shown) of the electronic apparatus 100.

The remote control device 300 may receive iris information from a user using a sensor for iris recognition (not shown), and transmit the signal including the input iris information to the user inputter 110 through the communicator (not shown).

The remote control device 300 may capture a user face using a camera for face recognition (not shown), and transmit a signal including the captured face image to the user inputter 110 through the communicator (not shown) of the electronic apparatus 100.

The voice receiver 120 may include various voice receiving circuitry and be configured to receive user voices.

The voice receiver 120 may receive a user voice input through circuitry including, for example, and without limitation, a microphone (not shown), provided in the user inputter 110. The voice receiver 120 may receive a user voice signal received in an analog form and converted into a digital form through the microphone (not shown) provided in the user inputter 110.

The voice receiver 120 may receive a voice signal input through the microphone (not shown) included in the remote control device 300 or other external devices (not shown) from the remote control device 300 or other external devices (not shown)

The storage 130 may be configured to store an operating system (OS) for controlling the overall operations of the elements of the electronic apparatus 100 and commands or data related to the elements of the electronic apparatus 100.

The storage 130 may be embodied, for example, and without limitation, as a non-volatile memory (e.g., hard disk, solid state drive (SSD), flash memory, etc.), a volatile memory, or the like.

The storage 130 may store data on a user-specific speaker recognition model. The user-specific speaker recognition model may be defined by a model of one or more parameters representing the characteristic of a voice uttered by each user on a user-by-user basis.

The characteristic of a voice may be based, for example, and without limitation, on Pitch, Formant, Linear Predictive Cepstral Coefficient (LPCC), Mel-Frequency Cepstral Coefficient (MFCC), Perceptual Linear Predictive (PLP), and the like.

The storage 130 may store information on voices to be received from a user to generate, update and complete a speaker recognition model for a user.

The storage 130 may store information on a time length of a voice to be received for each user to generate and/or update a speaker recognition model for each user and the amount of texts corresponding to voices to be received.

The storage 130 may store information on a plurality of texts corresponding to the voice to be received for each user to generate and/or update a user-specific speaker recognition model. The storage 130 may store information on voices corresponding to which texts are to be received to generate and/or update a speaker recognition model.

For example, the storage 130 may store information on basic texts corresponding to voices to be received for each user to generate a user-specific speaker recognition model, and information on a plurality of texts corresponding to voices to be received for each user to update or compete a user-specific speaker recognition model.

The plurality of texts corresponding to voices to be received for each user to generate and/or update a user-specific speaker recognition model will be described with reference to FIG. 6.

The processor 140 may include various processing circuitry and control the operations of the electronic apparatus 100.

The processor 140 may include a random access memory (RAM) (not shown), a read only memory (ROM) (not shown), a central processing unit (CPU), a graphic processing unit (not shown), and a system bus (not shown), and may perform operations and data processing related to control of other components included in the electronic apparatus 100.

The processor 140 may provide a guide to prompt a user to speak when user authentication is performed based on user information input through the user inputter 110.

The user information input through the user inputter 110 may include, for example, and without limitation, a user's id and/or password, user's fingerprint information, user's face recognition information, user's iris information, user's touch information on a pattern image displayed through a display (not shown) of the electronic apparatus 100, or the like.

The user authentication may be performed based on a result of comparison between user information pre-stored in the storage 130 and user information input through the user inputter 110. For example, user' access or log-in to the electronic apparatus 100, or user's access or log-in to an application or a service provided through the electronic apparatus 100 may be included in the user authentication.

The processor 140, based on user authentication being performed based on the user information input through the user inputter 110, may identify (determine) whether the speaker recognition model corresponding to the user information is stored. As a result of identification, if the speaker recognition model corresponding to the input user information has not yet been stored, the guide for prompting a user utterance may include a user interface to allow a user to select whether a speaker recognition model corresponding to user information is generated.

The user interface that allows a user to select whether to generate the speaker recognition model corresponding to the user information may include images displayed through the electronic apparatus 100, voices output through the electronic apparatus 100, and user's selection commands for the user inputter 110 of the electronic apparatus 100.

When a command to generate a speaker recognition model is received through the user inputter 110 based on a user interface, the processor 120 may provide a guide for prompting user' utterance, including some of a plurality of texts stored in the storage 130.

The plurality of texts stored in the storage 130 may be a plurality of texts corresponding to voices to be received for each user to generate and update a user-specific speaker recognition model.

Some of the plurality of texts may be texts to correspond to voices to be received for each user to generate a user-specific speaker recognition model.

Figure 4:
FIG. 4 is a diagram illustrating an example of a part of a guide that prompts an utterance of a user according to an embodiment of the disclosure.

FIG. 4 is a diagram illustrating an example of a part of a guide that prompts an utterance of a user. FIG. 4 illustrates an example part of an example guide for prompting user's utterance displayed through an electronic apparatus 100 or displayed through an external device 200 that receives an image signal from the electronic apparatus 100.

Referring to FIG. 4, the text "this is a sentence for speaker recognition" may be a text that a user who has completed the user authentication should utter to generate an initial speaker recognition model corresponding to user's own information.

Referring to FIG. 4, when a user's voice is received at the voice receiver 120 while a screen is displayed, the processor 140 may generate a speaker recognition model corresponding to user information based on the received voice and store the speaker recognition model in the storage 130.

For example, when the text corresponding to the received voice matches the text included in the guide (e.g., 'this is a sentence for speaker recognition' of FIG. 4), the processor 140 may generate a speaker recognition model based on the feature value of the received voice. The generated speaker recognition model may correspond to the input user information and may be stored in the storage 130.

When a user's log-in is used, for example, as user authentication, and a specific user's log-in is initially performed based on user information input through the user inputter 110, the processor 140 may provide a guide for prompting user's utterance.

The specific user's log-in may, for example, be a log-in to the electronic apparatus 100 or an application that operates through the electronic apparatus 100.

The processor 140 may generate and store a speaker recognition model corresponding to the user information based on the voice that is received through the voice receiver 120 and corresponds to the guide.

When the voice according to the guide is received through the voice receiver 120, the processor 140 may generate the speaker recognition model corresponding to the specific user based on the received voice and store the speaker recognition model in the storage 130.

When a speaker recognition model is generated after a user is authenticated, the processor 140 may provide a user interface providing a notification as to what extent a speaker recognition model has been completed. The user interface may be provided such that the electronic apparatus 100 or the external device 200 that receives a signal from the electronic apparatus 100 displays a guide image or outputs a guide voice.

The processor 140 may compare the voice received through the voice receiver 120 with a speaker recognition model stored in the storage 130 and update the speaker recognition model stored in the storage 130.

The processor 140 may compare the voice received through the voice receiver 120 during the voice recognition service with the speaker recognition model stored in the storage 130, and update the speaker recognition model.

The voice recognition service may include a service provided through an application including a voice recognition function of applications performed through the electronic apparatus 100. In this example, the voice recognition service may be a service provided by an application performing a voice recognition function of the applications stored in the storage 130 when the user authentication based on user information corresponding to the speaker recognition model stored in the storage 130 is performed.

The processor 140, based on a voice being received through the voice receiver 120 in providing a voice recognition service, may identify (determine) whether the speaker recognition model stored in the storage 130 and the feature value of the received voice have a similarity equal to or greater than a predetermined threshold value.

As a result of identification, if the similarity is equal to or greater than the predetermined threshold value, the processor 140 may update the speaker recognition model stored in the storage 130 based on the feature value of the received voice.

When the text corresponding to the voice received through the voice receiver 120 is included in the plurality of texts stored in the storage 130 while a voice recognition service is provided, the processor 140 may update a speaker recognition model stored in the storage 130 based on the feature value of the received voice. The plurality of texts stored in the storage 130 may be the texts corresponding to the voices to be received to update the speaker recognition model.

The processor 140 may update the speaker recognition model stored in the storage 130 based on the feature value of the received voice when the text corresponding to the voice to be received is included in the plurality of texts stored in the storage 130, in addition to the case where the feature value of the voice received through the voice receiver 120 while a voice recognition service is provided has a similarity equal to or greater than a predetermined threshold value to the speaker recognition model stored in the storage 130.

Figure 5A:
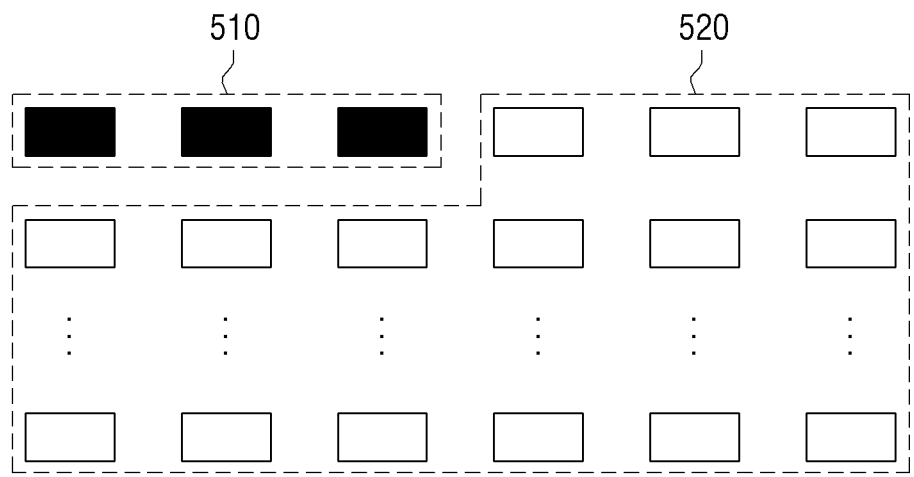
FIG. 5A is a diagram illustrating an example operation of an electronic apparatus in the presence of a plurality of texts to be received in the form of a voice to compete a speaker recognition model according to an embodiment of the disclosure.
Figure 5B:
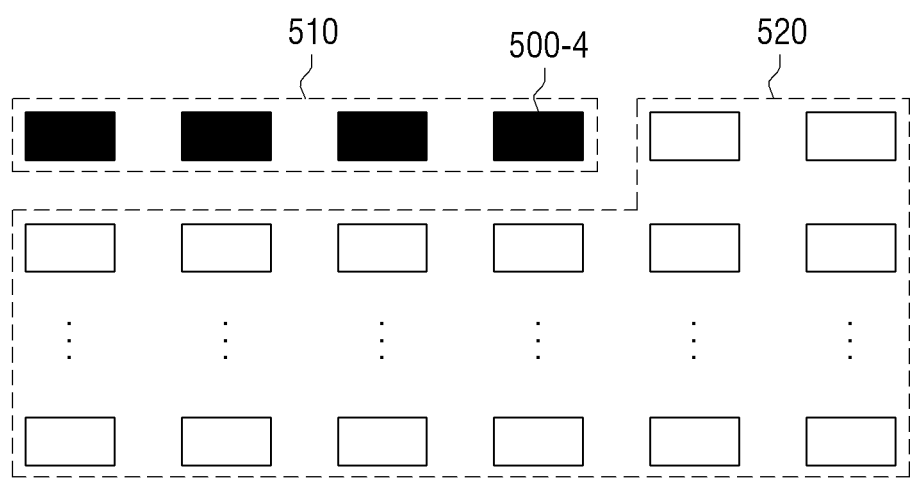
FIG. 5B is a diagram illustrating an example operation of an electronic apparatus in the presence of a plurality of texts to be received in the form of a voice to compete a speaker recognition model according to an embodiment of the disclosure.

FIGS. 5A and 5B are diagrams illustrating an example operation of the electronic apparatus 100 when a plurality of texts to be received in the form of a voice is predetermined to complete a speaker recognition model. The plurality of texts may be stored in the storage 130.

FIGS. 5A and 5B illustrate a plurality of texts corresponding to voices to be received to generate and update a speaker recognition model in a partial block form.

Referring to FIG. 5A, black blocks may be registered texts 510 which have already received user utterance voices among a plurality of texts. The voices corresponding to the registered texts 510 may be received through the voice receiver 120 and used for generating or updating a speaker recognition model.

However, white blocks may be non-registered texts 520 which have not yet been received user utterance voices among the plurality of texts. In other words, the voices corresponding to the non-registered texts 520 have not yet been received through the voice receiver 120, or have not been used for generating or updating a speaker recognition model.

When a voice is received through the voice receiver 120, the processor 140 may compare the speaker recognition model stored in the storage 130 with the received voice and measure the similarity, and identify (determine) whether the texts recognized as corresponding to the received voice match at least part of the non-registered texts 520.

As a result, FIG. 5B assumes that the similarity is measured to be equal to or greater than a predetermined threshold value, and the text recognized as corresponding to the received voice matches a text 500-4 of the non-registered texts 520.

FIG. 5B shows that the text 500-4 included in the non-registered texts 520 in FIG. 5A is included in the registered texts 510. In other words, the voice corresponding to the text 500-4 may be received through the voice receiver 120 and used for updating the speaker recognition model.

The processor 140 may identify whether the speaker recognition model corresponding to the user information has been updated. For example, when the user authentication is performed again based on the same user information as the user information as described above, the processor 140 may identify whether the updating of the speaker recognition model corresponding to the user information has been completed.

The processor 140 may identify (determine) the updating progress or completeness of the speaker recognition model corresponding to the user information as a ratio.

When the user authentication is performed based on the user information, the processor 140 may provide a user interface indicating (e.g., providing a notification of) the update progress of the speaker recognition model.

The user interface may be provided such that the electronic apparatus 100 and the external device 200 that receives a signal from the electronic apparatus 100 displays a guide image or outputs a guide voice.

Figure 6:
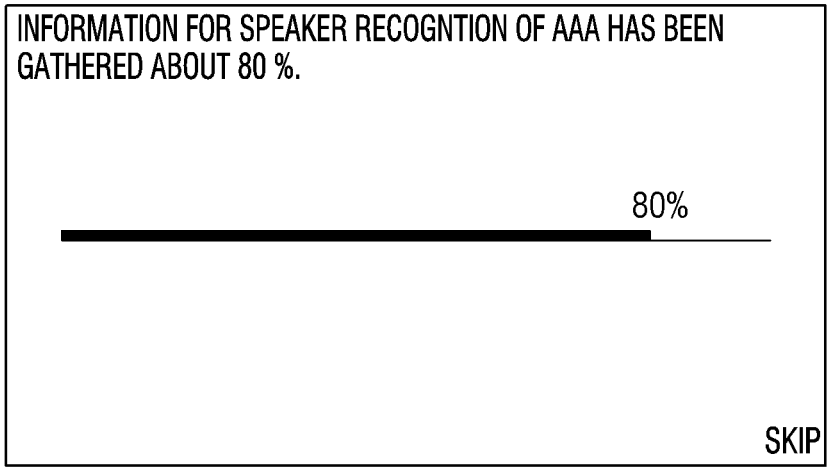
FIG. 6 is a diagram illustrating an example of a user interface indicating an update progress of a speaker recognition model according to an embodiment of the disclosure.

FIG. 6 is a diagram illustrating an example of a user interface displaying an update progress of a speaker recognition model. FIG. 6 may, for example, be a guide image displayed for indicating the updating progress of a speaker recognition model.

FIG. 6 assumes a situation where user authentication for user "AAA" is performed as a result of inputting user information for user "AAA".

Referring to FIG. 6, the speaker recognition model of the user "AAA" confirms that the update has been completed by 80%.

When a log-in is provided, for example, as the user authentication, the processor 140 may compare a voice received through the voice receiver 120 in providing a voice recognition service while a specific user is logged in with the speaker recognition model stored in the storage 130 and update a speaker recognition model.

The electronic apparatus 100 may efficiently complete a user-specific speaker recognition model using a user voice that is naturally received while a voice recognition service is provided without requiring a user to speaker utterance corresponding all the texts necessary for generating and updating a speaker recognition model.

The electronic apparatus 100 may provide the update progress of the user-specific speaker recognition model in the form of a user interface after performing user authentication on a user-by-user basis. Therefore, a user may clearly recognize a progress of registering a speaker recognition model without repeating tedious operations.

The processor 140 may recognize a user corresponding to the voice received through the voice receiver 120 based on the updated speaker recognition model.

When the speaker recognition model for a specific user is continuously updated and, and the final speaker recognition model of the specific user is generated (completed), the processor 140 may identify (determine) whether the voice received through the voice receiver 120 is the specific user's voice.

An example embodiment using the completed final speaker recognition model will be described in greater detail below, after example embodiments of updating the speaker recognition model in the electronic apparatus 100 of the disclosure have been described.

The processor 140 may identify (determine) whether the speaker recognition model corresponding to the user information has been updated when user authentication is performed again based on user information, and if it is identified (determined)_that the update of the speaker recognition model has not been completed, a guide for prompting the utterance of a text that is not uttered by a user among the plurality of texts stored in the storage 130 may be provided.

The text that has not been uttered by the user may indicate that the voice corresponding to the text has not yet been received through the voice receiver 120 and has not yet been recognized as the corresponding text. For example, it may be the case that the voice corresponding to the text has not yet been received through the voice receiver 120 to be recognized as the text when the user performs user authentication.

The plurality of texts stored in the storage 130 may be texts corresponding to the voices to be received to generate or update a speaker recognition model.

A guide for prompting an utterance of the text that has not been uttered by a user may be provided by displaying an image including the text that has not been uttered, or outputting a voice for the text that has not been uttered.

For example, when the processor 140 identifies (determines) that the update of the speaker recognition model corresponding to the user information has advanced by 90 percentage, the processor 140 may provide a guide for prompting the utterance of the texts necessary for updating the remaining 10 percentage, for example, the text that has not yet been uttered by a user among the plurality of texts stored in the storage 130, When the voice according to the guide is received through a voice receiver, the processor 140 may update the speaker recognition model based on the feature value of the received voice and generate a final speaker recognition model corresponding to the user information.

When the feature value of the received voice is similar to the feature value of the speaker recognition model stored in the storage 130 by a predetermined threshold value or more, and the text corresponding to the received voice matches at least a part of the texts that have not yet been uttered, the processor 140 may update the speaker recognition model stored in the storage 130 based on the received feature value of the received voice and generate a final speaker recognition model corresponding to the user information.

This is an example embodiment for quickly completing a speaker recognition model for a user without imposing a large burden on the user when few text that has not yet been uttered by a user remains among the plurality of texts stored in the storage 130.

Based on the above-described example embodiment, as a result of completing the update of a speaker recognition model, if a final speaker recognition model is generated and stored in the storage 130, the processor 140 may identify (determine) whose utterance the voice received through the voice receiver 120 is based thereon. The processor 140 may perform user authentication based on the identification result.

In this example, although a user randomly utters a text, the processor 140 may recognize a user based on the final speaker recognition model, and it is possible to perform user authentication based thereon.

For example, if a final speaker recognition model corresponding to user information of each of a plurality of users is stored in the storage 130, the processor 140 may identify (determine) whose voice each of the plurality of voices received through the voice receiver 120 is, and perform user authentication for the identified user.

For example, when voice recognition for free utterance starts without an additional operation, or voice recognition for free utterance starts only with a mere operation of pressing a specific button, the processor 140 may identify whose voice the randomly uttered voice is and perform user authentication for the identified user, and start voice recognition for the voice which is freely uttered by the authenticated user. In this regard, when a specific button provided in the remote control device 300 is pressed by a user, the electronic apparatus 100 may receive a signal including a request to start voice recognition from the remote control device 300, then recognize a user based on the updated speaker recognition model and the voice freely uttered by the user, and start recognition of a voice freely uttered by the user.

The processor 140 may perform user authentication using a method for verifying whether the voice received through the voice receiver 120 is a user's voice based on the final speaker recognition model corresponding to the user information including, for example, and without limitation, at least one of user's id/password information, touch information, fingerprint information, face information, iris information, or the like, received through the user inputter 110.

For example, when a user A utters a random sentence while placing a finger onto a fingerprint sensor (not shown) included in the remote control device 300 or the electronic apparatus 100, the voice corresponding to the random sentence uttered by user A may be transmitted to the voice receiver 120 through the remote control device 300 or a microphone (not shown) included in or the electronic apparatus 100.

The processor 120 may compare user information corresponding to the final speaker recognition model in which the feature values of the received voice and signal match each other by a predetermined threshold value or more, among the final recognition models stored in the storage 130, with user information corresponding to the fingerprint recognized through a fingerprint sensor (not shown), and when the two user information is determined to be the same as the information on user A, may perform user authentication on user A.

The processor 140 may provide a user customized service based on the identification of whose voice the voice received through the voice receiver 120 is without performing additional user authentication.

In this example, the user customized service may include, for example, and without limitation, allowing or blocking a content with age restriction, providing a customized advertisement in consideration of the history of user specific content usage, providing customized user interface considering the user-specific user interface usage history, or the like.

Figure 7:
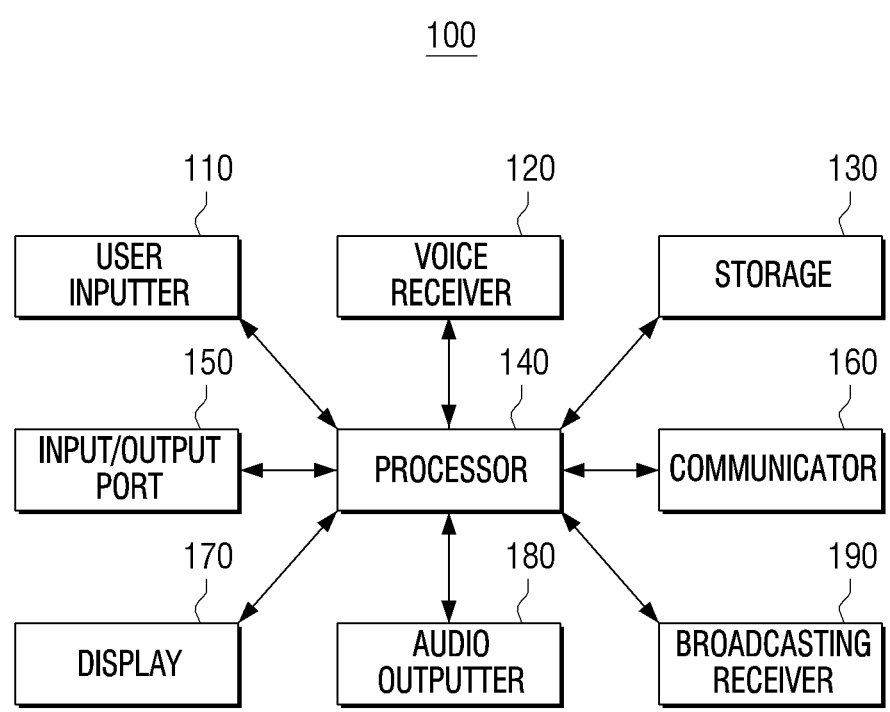
FIG. 7 is a block diagram illustrating an example configuration of an electronic apparatus according to various example embodiments of the disclosure.

FIG. 7 is a block diagram illustrating an example configuration of an electronic apparatus according to various example embodiments of the disclosure.

Referring to FIG. 7, an electronic apparatus 100 may further include at least one of an input/output port 150, a communicator (e.g., including communication circuitry) 160, a display 170, an audio outputter (e.g., including audio output circuitry) 180, and a broadcasting receiver (e.g., including broadcast receiving circuitry) 190, including a user inputter (e.g., including input circuitry) 110, a voice receiver (e.g., including voice receiving circuitry) 120, a storage 130, and a processor (e.g., including processing circuitry) 140.

The electronic apparatus 100 may receive signals for images and/or voices from an external source, or transmit images and/or voice signals to an external source through the input/output port 150.

For this purpose, the input/output port 150 may be implemented, for example, and without limitation, as a wired port such as an HDMI port, a display port, an RGB port, a Digital Visual Interface (DVI) port, a Thunderbolt, a component port, or the like. The input/output port 150 may be implemented as a port for wireless communication such as, for example, and without limitation, Wi-Fi, Bluetooth communication, or the like.

The input/output port 150 may be implemented as an HDMI port or a Thunderbolt, and may be configured to transmit images and audio signals together. However, a first port for transmitting an image signal and a second port for transmitting a voice signal may be implemented separately.

For example, when the electronic apparatus 100 includes a display 170, the electronic apparatus 100 may receive signals for images and/or voices including a specific user interface from an external device (not shown) such as a set-top box through the input/output port 150.

For another example, when the electronic apparatus 100 is embodied as a set-up box without the display 170, the electronic apparatus 100 may transmit the images and/or voices including a specific user interface to the external device 200 through the input/output port 150 so that the images and/or voices including the specific user interface may be output through the external device 200.

The communicator 160 may include various communication circuitry and be configured to perform communication with various types of external devices according to various types of communication methods. The communicator 160 may include various chips, each including various processing circuitry, such as, for example, and without limitation, a Wi-Fi chip (not shown), a Bluetooth chip (not shown), or the like.

The processor 140 may include various processing circuitry and perform communication with various external devices using the communicator 160. The communicator 160 may perform data communication with various external devices wiry or wirelessly.

When performing data communication with an external device (not shown) by a wireless communication method, the communicator 160 may include, for example, and without limitation, at least one of a WIFI DIRECT communication module, a Bluetooth module, an infrared data association (IrDA) Module, a Near Field Communication (NFC) module, a Zigbee module, a cellular communication module, a third generation (3G) mobile communication module, a fourth generation (4G) mobile communication module, a fourth generation Long Term Evolution (LTE), a fifth generation Long Term Evolution (5GLTE), or the like.

For example, the electronic apparatus 100 including the display 170 may receive data from the remote control device 300 through the communicator 160. For example, the communicator 160 may receive data and/or signals for user information input to the remote control device 300, data and/or signals for user voices input to a microphone (not shown) of the remote control device 300, and data and/or signals for user commands input to the remote control device 300 from the remote control device 300 using, for example, a Bluetooth or Wi-Fi communication method.

The communicator 160 that receives data and/or digital signals for user voices input to a microphone (not shown) of the microphone 300 may transmit the received data and/or digital signals to the voice receiver 120.

The communicator 160 that receives user information data such as iris recognition data, face capturing data, fingerprint data, or the like, received through various sensors (not shown) or a camera, may transmit the received user information data to at least one of the user inputter 110 or the processor 140.

The communicator 160 may transmit and receive data related to the function performed by the electronic apparatus 100 to or to from an external server (not shown).

The communicator 160 may separately include a first communicator (not shown) for transmitting or receiving data to or from the external device 200 or the remote control device 300, and a second communicator (not shown) for transmitting or receiving data to or from the external server (not shown). The first communicator (not shown) may be embodied, for example, and without limitation, as an Ethernet modem, a Wi-Fi module, a Bluetooth module, or the like, and the second communicator may be embodied, for example, and without limitation, as an additional Wi-Fi module.

The display 170 may display an image under the control of the processor 140. The display 170 may be implemented, for example, and without limitation, as a liquid crystal display (LCD), a plasma display panel (PDP), an organic light emitting diode (OLED), a transparent OLED (TOLED), or the like. When the display 170 is embodied with LC, the display 170 may include a driving circuit (not shown) that can be embodied in the form of an a-Si TFT, a low temperature poly silicon (LTPS) TFT, an organic TFT (OTFT0, etc. and a backlight unit (not shown).

The display 170 may be embodied as a touch screen type including a touch panel for sensing a user's touch and it may be included in the user inputter 110 in this case.

The display 170 may output an image included in a broadcasting signal received through the broadcasting receiver 190, an image included in a signal received through the communicator 160, an image input through the user inputter 110, an image included in an image file stored in the storage 130, and an image included in a signal received from an external source through the input/output port 150.

The audio outputter 180 may include various audio output circuitry and be configured to output a specific voice under the control of the processor 140. The audio outputter 180 may include various audio output circuitry, such as, for example, and without limitation, a speaker (not shown), a headphone/earphone output terminal (not shown), or the like.

The audio outputter 180 may output a voice included in a broadcasting signal received through the broadcasting receiver 190, a voice included in a signal received through the communicator 160, a voice input through a microphone (not shown) included in the user inputter 110, a voice included in an audio file stored in the storage 130, and a voice included in a signal received from an external source through the input output/port 150.

The broadcast receiver 190 may include various broadcast receiving circuitry and receive a signal for a broadcasting content. The broadcasting content may include, for example, and without limitation, images, audio and additional data (e.g., EPG), or the like, and the broadcast receiver 190 may receive broadcast content signals from various sources such as, for example, and without limitation, terrestrial broadcast, cable broadcast, satellite broadcast, Internet broadcast, or the like.

The broadcast receiver 190 may include various broadcast receiving circuitry, such as, for example, and without limitation, a tuner (not shown), a demodulator (not shown), an equalizer (not shown), and the like, in order to receive broadcast contents transmitted from a broadcasting station.

Figure 8:
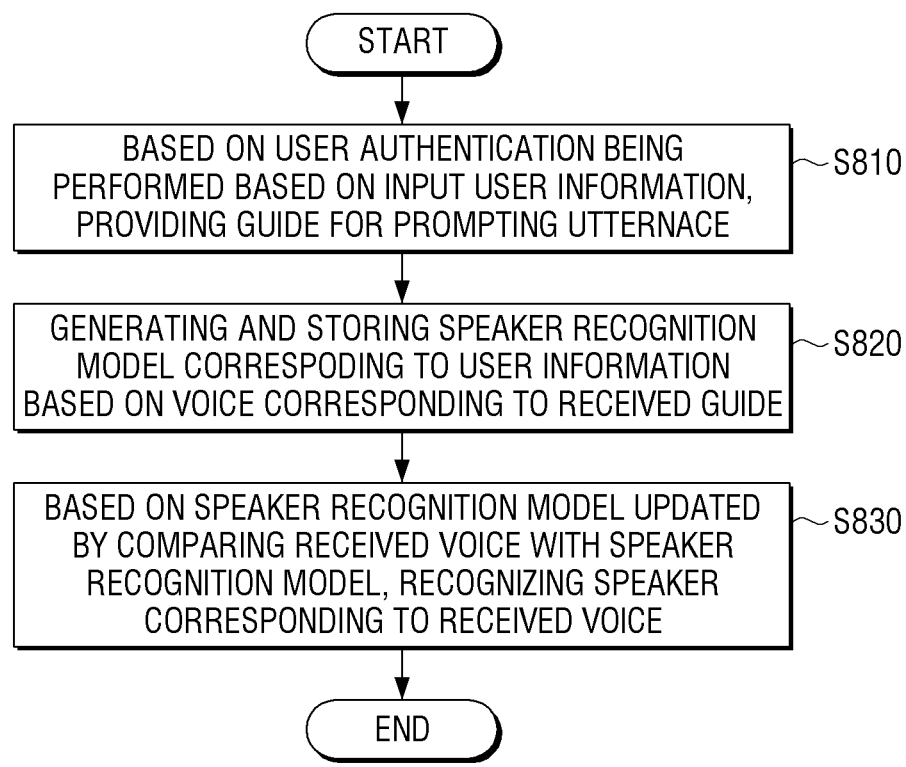
FIG. 8 is a flowchart illustrating an example method of controlling an electronic apparatus according to an embodiment of the disclosure.

FIG. 8 is a flowchart illustrating an example method of controlling an electronic apparatus according to an embodiment of the disclosure.

A controlling method may include providing a guide for prompting user utterance when user authentication is performed based on user information input through a user inputter at step S810.

The guide for prompting user utterance may include at least one of a process of displaying an image including a text to be uttered by a user, or a process of outputting a voice corresponding to the text to be uttered by the user.

For example, a guide for prompting user utterance may guide a user to utter a voice corresponding to some of a plurality of texts corresponding to the voices to be received for generating and updating a user-specific speaker recognition model.

The guide for prompting user utterance may include a user interface for asking the user whether or not to perform utterance to generate a speaker generation model corresponding to the user information and for allowing the user to select the utterance.

When a user's log-in is used, for example, as user authentication, when a specific user is initially logged in based on the user information input through a user inputter, a guide for prompting user utterance may be provided.

A controlling method may include generating and storing a speaker recognition model corresponding user information based on the voice corresponding to the received guide at step S820.

When some of a plurality of texts corresponding to voices to be received is included in a guide to generate and update a user-specific speaker recognition model, and a text corresponding to the voice received through a voice receiver matches the text included in the guide, the speaker recognition model may be generated based on the feature of the received voice.

When a user's log-in is used, for example, as user authentication, if a voice according to a guide is received through a voice receiver, a speaker recognition model corresponding to a specific user may be generated and stored based on the received voice.

Figure 9:
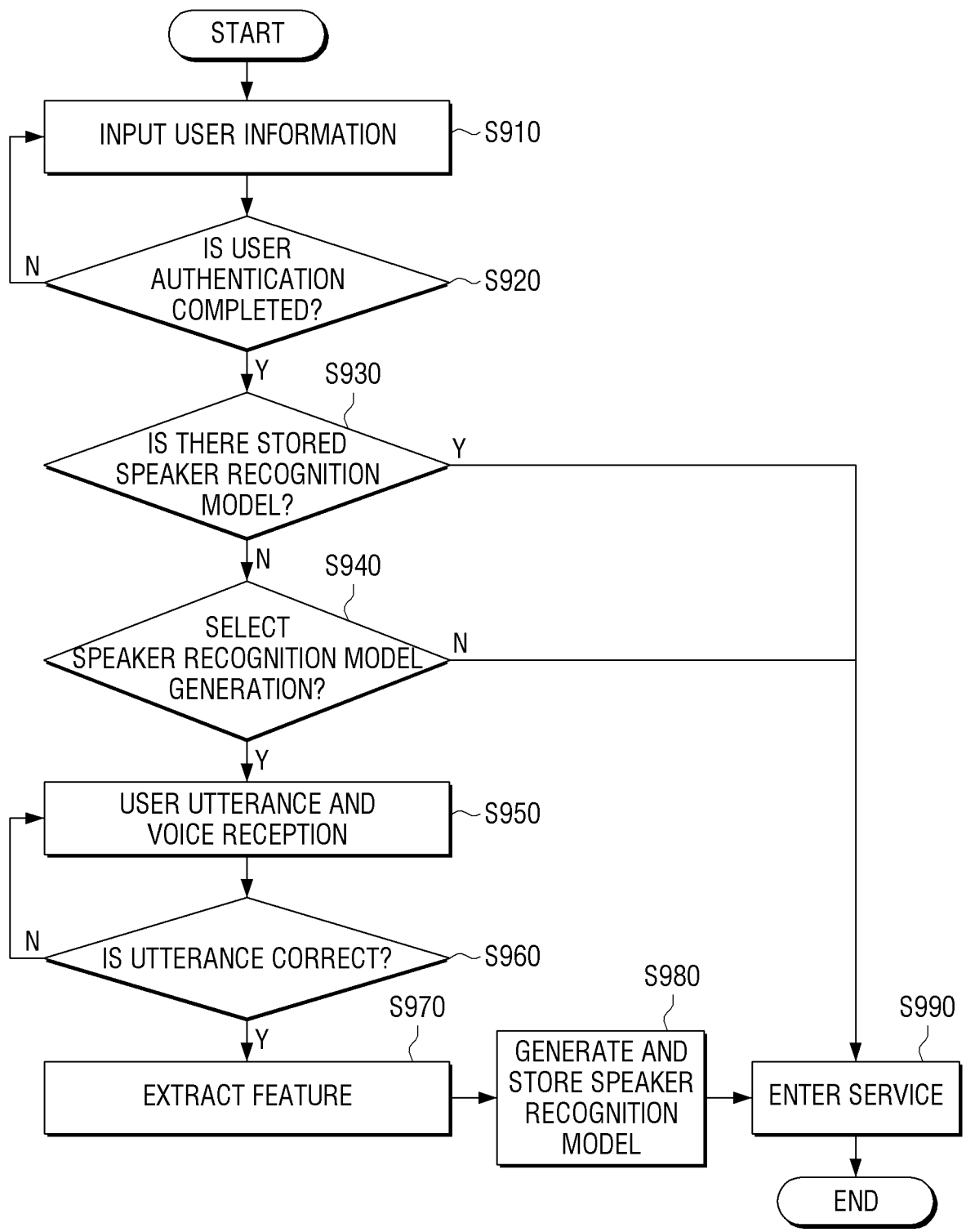
FIG. 9 is a flowchart illustrating an example process of generating an initial speaker recognition model as a basis according to an embodiment of the disclosure.

Steps S810 and S820 as described above may be included in an initial speaker recognition generation process 900 (see, e.g., FIG. 9).

After generating an initial speaker recognition model, a controlling method may include comparing the voice received through the voice receiver with the speaker recognition model and recognizing a speaker corresponding to the received voice based on the updated speaker recognition model at step S830.

While the user authentication to the electronic apparatus is being maintained, the stored speaker recognition model may be updated by comparing the voice received through a voice receiver in providing a voice recognition service for the user with the stored speaker recognition model.

In this example, when a voice is received through the voice receiver while the voice recognition service is provided, it may be identified whether the stored speaker recognition model and the feature value of the received voice have a similarity equal to or greater than a predetermined threshold value, and as a result of identification, if the similarity is equal to or greater than the predetermined threshold value, the stored speaker recognition model may be updated based on the feature value of the received voice.

When the text corresponding to the voice received through the voice receiver while the voice recognition service is provided is included in a plurality of pre-stored texts, the stored speaker recognition model may be updated based on the feature value of the received voice. The plurality of pre-stored texts may be texts corresponding to the voices to be received through the voice receiver for generating or updating a user-specific speaker recognition model.

When a user's log-in is used, for example, as user authentication, a speaker recognition model may be updated by comparing the voice received through the voice receiver while the voice recognition service is provided with the stored speaker recognition model when a specific user is logged in.

When user authentication is performed again based on user information, a user interface indicating the update progress of a speaker recognition model may be provided.

When user authentication is performed again based on user information, it may be identified whether a speaker recognition model corresponding to user information has been updated, and if it is identified that the updating of a speaker recognition model has not been completed, a guide for prompting user utterance of a text that has not yet been uttered by a user among the plurality of pre-stored texts may be provided.

When a voice according to the guide is received through the voice receiver, a speaker recognition model may be updated based on the feature value of the received voice, and a final speaker recognition model corresponding to user information may be generated.

Figure 10:
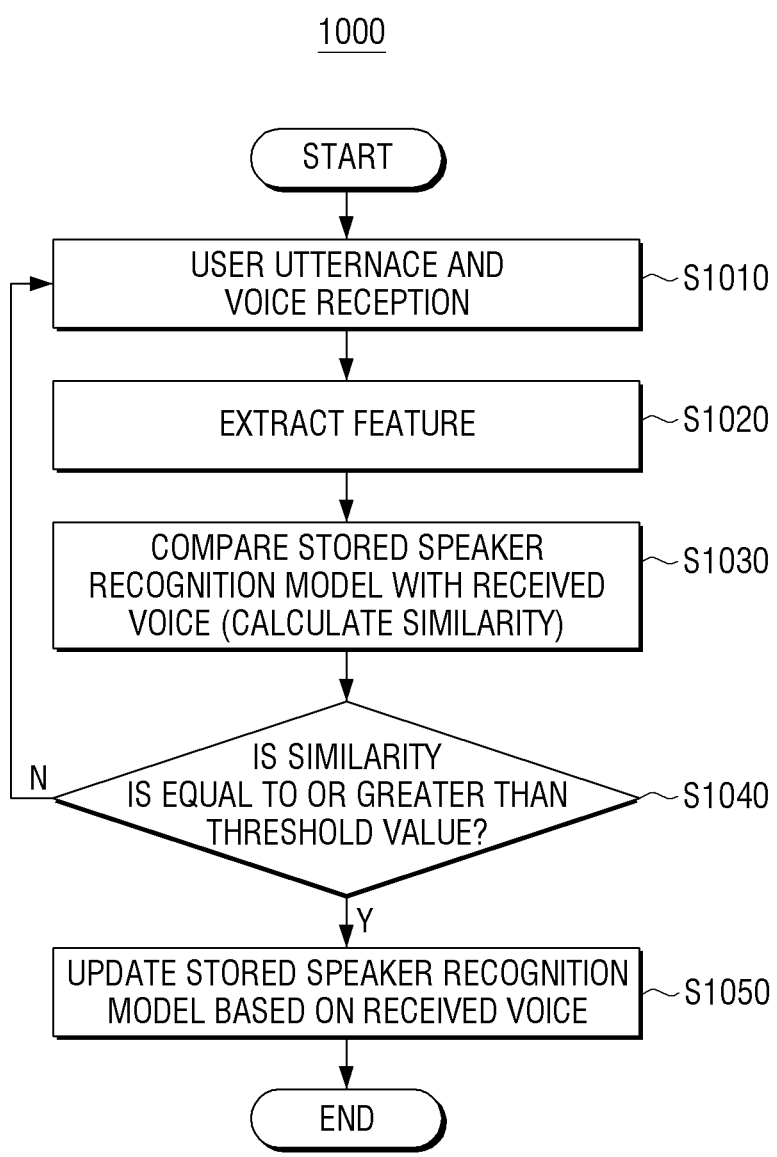
FIG. 10 is a flowchart illustrating an example process of updating a speaker recognition model without requesting a user to speak according to an embodiment of the disclosure.
Figure 11:
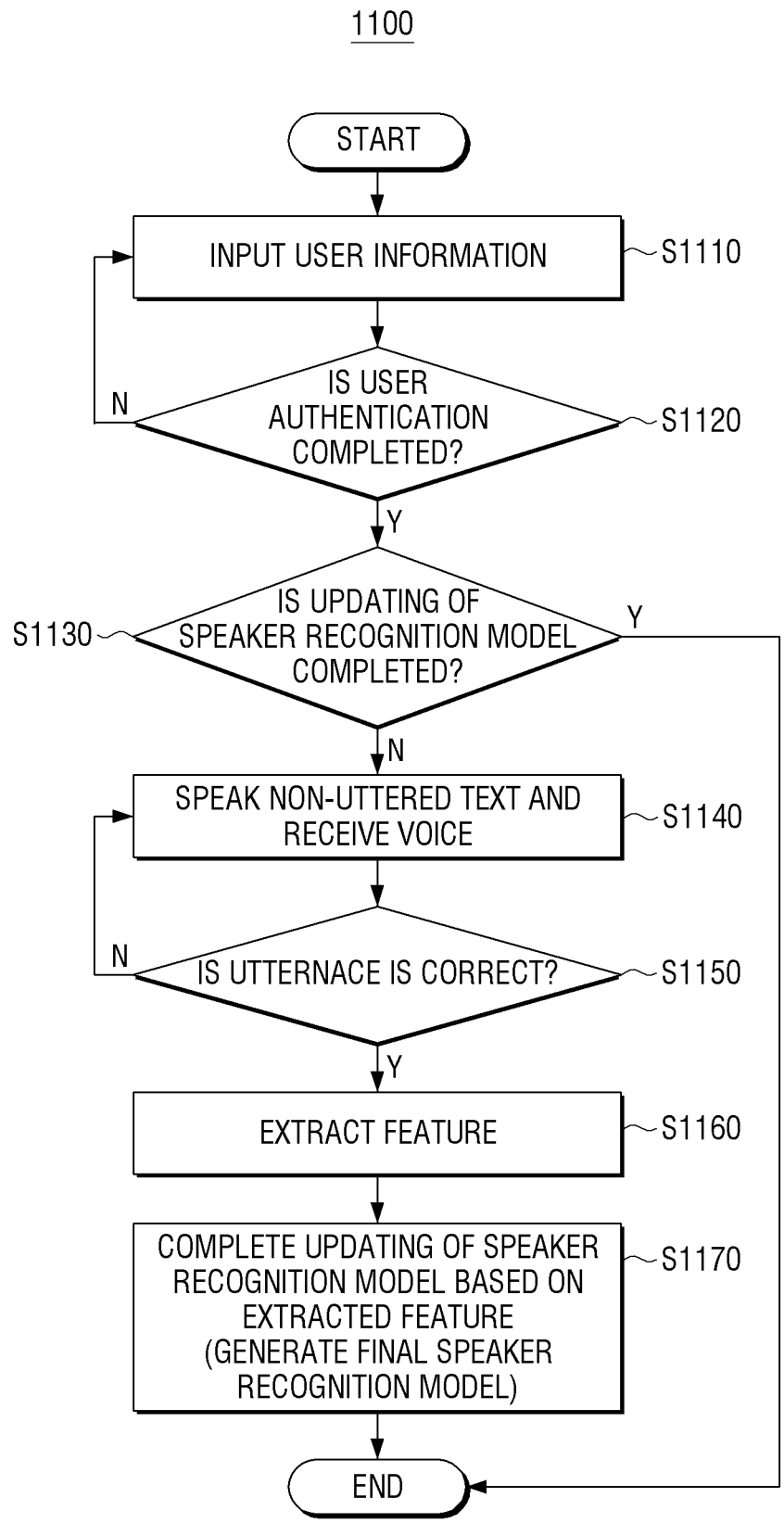
FIG. 11 is a flowchart illustrating an example process of updating a speaker recognition model through a request for a user to speak according to an embodiment of the disclosure.

The updating of the speaker recognition model may include not only a process of updating a speaker recognition model without an utterance request for a user 1000 (see, e.g., FIG. 10), but also a process of updating a speaker recognition model through an utterance request for a user 1100 (see, e.g., FIG. 11).

After updating a speaker recognition model, a controlling method may include recognizing a user corresponding to the voice received through the voice receiver based on the updated speaker recognition model.

For example, a user corresponding to the voice received through the voice receiver may be recognized based on the final user-specific speaker recognition model generated upon the completion of update.

FIG. 9 is flowchart illustrating an example process of generating an initial speaker recognition model according to an embodiment of the disclosure.

When user information is input to an electronic apparatus at step S910, user authentication may be performed by comparing the pre-stored information with the input user information. If the input user information does not match the user information to be authenticated at step S920-N, user information may be input again.

When user authentication is completed based on the input user information at step S920-Y, it may be identified (determined) whether a speaker recognition model corresponding to the input user information is stored at step S930. If the speaker recognition model corresponding to the input user information is stored at step S930-Y, a user may immediately enter a service at step S990.

If a speaker recognition model corresponding to the input user information is not stored at step S930-N, a user may select whether to generate the speaker recognition model corresponding to the input user information at step S940. For example, a user may select whether to perform utterance for generating a speaker recognition model necessary for recognizing a user's own voice.

A process of asking a user whether to generate a speaker recognition model corresponding to the input user information and a process of allowing a user to select may be processed by a user interface.

The user interface may include a process of displaying an image that displays information, a process of outputting voices on information and a process of receiving user's selection. When a user selects not to generate a speaker recognition model at step S940N, the user may enter a service as step S990.

When a user selects to generate a speaker recognition model corresponding to user information at step S940-Y, a guide for prompting user utterance may be provided and a voice uttered by a user may be received at step S950.

A guide for prompting user utterance may include a process of displaying an image including a text to be uttered by a user, and a process of outputting a voice corresponding to text to be uttered by a user.

The text to be uttered by a user may be a text corresponding to the user voice to be received to generate an initial speaker recognition model.

When the voice uttered by a user is received, it may be identified (determined) whether the utterance is accurate (correct) at step S960. The identification as to whether or not the utterance is accurate (correct) may refer, for example, to whether the user correctly utters a voice to be received in order to generate an initial speaker recognition model. In this example, the identification as to whether or not the utterance is accurate may be based on whether or not the result (text) of recognizing the voice uttered by the user coincides with the text to be uttered by the user by a threshold value or more.

The above-described identification (determination) process may include identifying whether a voice uttered by a user exactly corresponds to the sentence, for example, when a guide for prompting a user's utterance requests a user to utter a phrase "Hello, I am so pleased to meet you".

As a result of identification, if an utterance is not accurate at step S960-N, a reuttered voice may need to be received at step S950.

If the utterance is determined to be correct (accurate) at step S960-Y, the feature of the received voice may be extracted at step S970. The feature of the voice may be based, for example, and without limitation, on Pitch, Formant, Linear Predictive Cepstral Coefficient (LPCC), Mel-Frequency Cepstral Coefficient (MFCC), Perceptual Linear Predictive (PLP), or the like.

The initial speaker recognition model corresponding to the input user information may be generated and stored based on the extracted feature at step S980.

The above-described processes may not require the user to speak a large amount of utterances enough to complete the speaker recognition model. Instead, a user may enter the service with only being request to speaker utterances sufficient to generate an initial speaker recognition model at step S990. Therefore, the convenience of the user can be increased.

However, since the speaker recognition model has not yet been completed, it may be necessary to update the generated speaker recognition model frequently.

FIG. 10 is a flowchart illustrating an example process of updating a speaker recognition model without requesting a user to speak 1000.

The process 1000 may be continuously performed while the same user is using the voice recognition service as a result of performing the same user authentication by inputting the same user information as that in a process of generating the initial speaker recognition model 900.

The process 1000 may include receiving a voice uttered by a user when user authentication on a specific user is performed again after user information corresponding to the generated speaker recognition model is input at step S1010. This might be the situation where a user who finished authentication utters various texts in the use of a voice recognition service through an electronic apparatus.

When a voice is received, the feature on the received voice may be extracted at step S1020. In addition, a similarity may be calculated (determined) by comparing the extracted feature value with the stored speaker recognition model at step S1030. In other words, it may be identified (determined) whether the pre-stored feature of the speaker recognition model corresponding to the input user information matches the feature of the newly received voice by a threshold value or more. In addition, it may be identified (determined) whether the similarity is equal to or greater than a threshold value at step S1040.

As a result of identification (determination), if the similarity is less than a threshold value at step S1040-N, the received voice may not likely correspond to the input user information, the pre-stored speaker recognition model may not be updated based on the received voice.

However, if the similarity is equal to or greater than a threshold value at step S1040-Y, the received voice may likely correspond to the input user information, the pre-stored speaker recognition model may be updated based on the received voice at step S1050. In other words, a speaker recognition model may be updated by adding the feature of the received voice to the feature of the pre-stored speaker recognition model and the updated speaker recognition model may be stored again.

In addition to the similarity between the feature of the stored speaker recognition model and the feature of the received voice, whether the received voice corresponds to the pre-stored text may also be an issue to be considered. The pre-stored text may be a text corresponding to a voice to be received for updating a user-specific speaker recognition model.

In other words, only when the feature of the received voice is similar to the feature of the stored speaker recognition model by a threshold value or more, and additionally when the received voice corresponds to the text corresponding to the voice to be received (has to be received) for updating a speaker recognition model, the pre-stored speaker recognition model may be updated based on the received voice.

A process of updating a speaker recognition model through an utterance request for a user 1100 (see, e.g., FIG. 11) may be additionally needed other than the process of updating a speaker recognition model without an utterance request for a user 1000.

The process of updating a speaker recognition model through an utterance request for a user 1100 may be performed at a time when the updating of the speaker recognition model is almost completed to generate a 100 percentage completed final speaker recognition model.

The process of updating a speaker recognition model through an utterance request for a user 1100 may be useful if a voice corresponding to a specific text among a plurality of texts has not yet been received, or has not been received for a long time although all the voices corresponding to the plurality of pre-stored texts should be received to complete a final speaker recognition model.

The process of updating a speaker recognition model through an utterance request for a user 1100 may also be useful when a voice having a predetermined time or capacity should be received to complete the final speaker recognition model, but it has not yet been received, and a final speaker recognition model needs to be completed quickly.

FIG. 11 is a flowchart illustrating an example process of updating a speaker recognition model through a request for a user to speak 1100.

At the process 1100, if user information is input at step S1110, and user authentication is completed again at step S1120-Y, it may be identified (determined) whether the updating of a speaker recognition model corresponding to the input user information has been completed at step S1130.

As a result of identification, if the updating of the speaker recognition model has not been completed at step S1130-N, the user may be requested to speak unuttered texts, and the voices uttered by a user may be received at step S1140.

The unuttered texts may be the remaining texts which do not correspond to the already received voice among a plurality of texts when only voices corresponding to a part of texts are received and used for updating a speaker recognition model although voices corresponding to a plurality of texts need to be received to complete a speaker recognition model.

In addition to requesting the user to utter the non-uttered text, the user may also be asked to utter a voice matching a specific time or an amount needed to complete the speaker recognition model.

In this example, when the updating of the speaker recognition model has not been completed and the updating of the speaker recognition model has progressed beyond a certain ratio, a user may be requested to utter a voice, and then the voice may be received.

For example, if the update of the speaker recognition model is completed only about 20 percent, the user may be burdened with a large amount of utterances to speak for completion of the speaker recognition model of the user, so that only when the update of the speaker recognition model is completed over 90 percent, a user may be requested to utter and then the voice may be received.

A user may be requested to utter using a guide for prompting user's utterance.

If a voice is received as a result of an utterance request, it may be identified (determined) whether the utterance is correct at step S1150. For example, it may be identified (determined) whether a user correctly utters a voice corresponding to a text that has not been uttered. In other words, it may be identified (determined) whether the result of recognizing the received voice corresponds to the text that has not been uttered.

As a result of identification, if an utterance is correct at step S1150-Y, the feature of the received voice may be extracted at step S1160.

In this example, the feature of the received voice may be extracted only when the utterance is correct and the feature of the received voice is similar to the feature of the conventional speaker recognition model by a predetermined value or more.

The updating of the speaker recognition model may be completed based on the extracted feature and the final speaker recognition model may be generated at step S1170.

The controlling method for the electronic apparatus in FIGS. 8 to 11, may be performed by the electronic apparatus 100 illustrated and described in FIGS. 3 and 7, and/or may be performed by a system including the remote control device 300.

The above-described controlling method may be performed by the electronic apparatus 100 without a display, the external device 200 with a display, and/or the remote control device 300.

The above-described controlling method may be performed by the electronic apparatus 100 and/or a server (not shown) for transmitting or receiving data to or from the electronic apparatus 100.

For example, only the process of receiving user information from a user and receiving a user voice may be performed by the electronic apparatus 100, and the process of performing user authentication based on the input user information and generating and updating a speaker recognition model based on the received voice may be performed by a server (not shown). The server (not shown) may transmit a command signal to provide a guide for prompting user's utterance to the electronic apparatus 100.

In this example, if a final user-specific speaker recognition model is generated by the server (not shown), the electronic apparatus 100 may transmit data on the received voice to the server, and the server may identify whose voice the received voice is and transmit the data on the identification result to the electronic apparatus 100.

For another example, not only the process of receiving user information and user voices, but also the process of performing user authentication and providing a guide for prompting a user utterance may be performed by the electronic apparatus 100.

A guide may be provided to a user after the electronic apparatus 100 performs user authentication, and at the same time, the received voice may be transmitted to a server (not shown) and a speaker recognition model may be generated and updated through the server (not shown).

A calculation speed and a memory capacity at a predetermined level or more may be necessary for generating and updating a speaker recognition model by analyzing the feature of the received voice and storing the result, and this embodiment uses the server (not shown) in which a calculation speed is relatively outperforming, and data storage capacity is quite available compared to the electronic apparatus 100.

Meanwhile, the various example embodiments described above can be implemented in a recording medium that can be read by a computer or a similar device using software, hardware, or any combination thereof.

According to a hardware implementation, the embodiments described in this disclosure may be implemented, for example, and without limitation, as application specific integrated circuits (ASICs), digital signal processors (DSPs), digital signal processing devices (DSPDs), programmable logic devices (PLDs) programmable gate arrays, a processor, a controller, a micro-controller, a microprocessor, an electrical unit for performing other functions, or the like.

In some cases, embodiments described herein may be implemented by a processor 140 itself. According to software implementation, embodiments such as the procedures and functions described herein may be implemented in separate software modules. Each of the software modules may perform one or more of the functions and operations described herein.

The non-transitory computer readable medium refers to a medium that stores data semi-permanently, and is readable by an apparatus. For example, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM).

Although various example embodiments have been illustrated and described, it will be appreciated by those skilled in the art that various changes in form and detail may be made to the example embodiments without departing from the principles and spirit of the disclosure. Accordingly, the scope of the disclosure is not limited to the described example embodiments, but may be defined, for example, by the appended claims as well as equivalents thereto.

What is claimed is:

1. An electronic apparatus, comprising:
an inputter comprising input circuitry;
a voice receiver comprising voice receiving circuitry;
a storage configured to store a plurality of texts; and a processor configured to:
  based on user authentication regarding a user being performed according to user information input through the inputter, provide a guide for a user utterance of a text of the plurality of texts,
  obtain a speaker recognition model corresponding to the user based on a voice corresponding to the guide being received through the voice receiver, and store the speaker recognition model in the storage,
  based on user authentication regarding the user being performed again according to user information newly input via the inputter, identify completion of updating of the speaker recognition model corresponding to the user information based on at least user authentication being performed again based on the user information,
  based on at least the updating of the speaker recognition model not being completed, provide a guide for an utterance of a text that is not uttered by the user among the plurality of texts, and update the speaker recognition model based on a feature value of a voice received through the voice receiver and the speaker recognition model, and
  identify a user corresponding to a voice received through the voice receiver based on the updated speaker recognition model.

2. The electronic apparatus as claimed in claim 1, wherein the processor is further configured to:
  provide the guide including the text of the plurality of texts stored in the storage, and obtain the speaker recognition model based on a feature value of the voice corresponding to the guide based on a text corresponding to the voice corresponding to the guide matching the text included in the guide.

3. The electronic apparatus as claimed in claim 1, wherein the processor is further configured to:
  determine, based on a voice being received through the voice receiver while a voice recognition service is provided, whether the speaker recognition model stored in the storage and a feature value of the received voice have a similarity equal to or greater than a predetermined threshold value, and
  based on the similarity being equal to greater than the predetermined threshold value, update the speaker recognition model stored in the storage based on the feature value of the received voice.

4. The electronic apparatus as claimed in claim 3, wherein the processor is further configured to update the speaker recognition model stored in the storage based on the feature value of the received voice based on a text corresponding to the voice received through the voice receiver being included in the plurality of texts stored in the storage while the voice recognition service is provided.

5. The electronic apparatus as claimed in claim 1, wherein the processor is further configured to: based on a voice according to the guide being received through the voice receiver, update the speaker recognition model based on a feature value of the received voice and obtain a final speaker recognition model corresponding to the user information.

6. The electronic apparatus as claimed in claim 1, wherein the processor is further configured to provide a user interface indicating an updating progress of the speaker recognition model based on user authentication being performed based on the user information.

7. The electronic apparatus as claimed in claim 1, wherein the processor is further configured to, based on user authentication being performed based on the user information input through the inputter, identify whether a speaker recognition model corresponding to the user information is stored in the storage,
  wherein the guide includes a user interface for selecting whether to obtain the speaker recognition model corresponding to the user information, based on the speaker recognition model corresponding to the user information not being stored in the storage.

8. The electronic apparatus as claimed in claim 1, wherein the processor is further configured to:
  provide a guide for an utterance of a specific user based on the specific user being initially logged in based on the user information input through the inputter,
  obtain a speaker recognition model corresponding to the specific user based on a voice being received through the voice receiver according to the guide and store the speaker recognition model in the storage, based on the voice according to the guide being received through the voice receiver, and
  update the speaker recognition model by comparing the speaker recognition model stored in the storage with a voice received through the voice receiver while a voice recognition service is provided when the specific user is logged in.

9. A method of controlling an electronic apparatus, the method comprising:
  storing a plurality of texts;
  based on user authentication regarding a user being performed according to user information input, providing a guide a user utterance of a text of the plurality of texts;
  obtaining and storing a speaker recognition model corresponding to the user based on a voice corresponding to the guide, the voice being received through a voice receiver;
  based on user authentication regarding the user being performed again according to user information newly input, identifying completion of updating of the speaker recognition model corresponding to the user information based on at least user authentication being performed again based on the user information,
  based on at least the updating of the speaker recognition model not being completed, providing a guide for an utterance of a text that is not uttered by the user among the plurality of texts, comparing a voice received through the voice receiver with the speaker recognition model; and
  identifying a user corresponding to a voice received through the voice receiver based on the updated speaker recognition model.

10. The method as claimed in claim 9, wherein the obtaining and storing of the speaker recognition model comprises, obtaining the speaker recognition model based on a feature value of the voice corresponding to the guide based on a text corresponding to the voice corresponding to the guide matching the text of the plurality of texts.

11. The method as claimed in claim 9, wherein the updating of the speaker recognition model comprises, determining whether the stored speaker recognition model and a feature value of a voice received through the voice receiver have a similarity equal to or greater than a predetermined threshold value based on the voice being received through the voice receiver while a voice recognition service is provided, and updating the stored speaker recognition model based on the feature value of the received voice based on the similarity being equal to or greater than the predetermined threshold value.

12. The method as claimed in claim 11, wherein the updating of the speaker recognition model comprises, updating the stored speaker recognition model based on the feature value of the received voice based on a text corresponding to the voice received through the voice receiver being included in the plurality of texts while the voice recognition service is provided.

13. The method as claimed in claim 10, further comprising:
obtaining a final speaker recognition model corresponding to the user information by updating the speaker recognition model based on a feature value of a voice according to the guide based on the voice according to the guide being received from the voice receiver.

14. The method as claimed in claim 9, further comprising:
providing a user interface indicating an update progress of the speaker recognition model based on user authentication being performed again based on the user information.

15. The method as claimed in claim 9, further comprising:
determining whether a speaker recognition model corresponding to the user information is stored based on user authentication being performed according to the user information input through the inputter,
wherein the guide includes a user interface that allows a user to select whether to obtain the speaker recognition model corresponding to the user information, based on the speaker recognition model corresponding to the user information not being stored.

16. The method as claimed in claim 9, wherein the providing of the guide comprises, providing a guide for an utterance of a specific user based on the specific user being initially logged in based on the user information input through the inputter,
wherein the obtaining and storing of the speaker recognition model comprises, based on a voice according to the guide being received through the voice receiver, obtaining and storing a speaker recognition model corresponding to the specific user based on the voice according to the guide, and
wherein the updating of the speaker recognition model comprises comparing a voice received through the voice receiver while a voice recognition service is provided when the specific user is logged in with the stored speaker recognition model.

17. A non-transitory computer readable medium having stored thereon, instructions which, when executed by a processor of an electronic apparatus, cause the electronic apparatus to perform operations, wherein the operations comprise:
storing a plurality of texts;
based on user authentication regarding a user being performed according to user information input, providing a guide a user utterance of a text of the plurality of texts;
obtaining and storing a speaker recognition model corresponding to the user based on a voice corresponding to the guide, the voice being received through a voice receiver;
based on user authentication regarding the user being performed again according to user information newly input, identifying completion of updating of the speaker recognition model corresponding to the user information based on user authentication being performed again based on the user information,
based on the updating of the speaker recognition model not being completed, providing a guide for an utterance of a text that is not uttered by the user among the plurality of texts, comparing a voice received through the voice receiver with the speaker recognition model; and
identifying a user corresponding to a voice received through the voice receiver based on the updated speaker recognition model.

\* \* \* \* \*